Patented July 30, 1974

1

3,826,643
METHOD OF CONTROLLING UNDESIRABLE PLANT SPECIES USING 3-NITROPYRIDINES
Robert Eugene Diehl, Trenton, and Bryant Leonidas Walworth, Pennington, N.J., assignors to American Cyanamid Company, Stamford, Conn.
No Drawing. Continuation-in-part of application Ser. No. 658,589, Aug. 7, 1967, now Patent No. 3,547,935, dated Dec. 15, 1970. This application Aug. 3, 1970, Ser. No. 60,776
Int. Cl. A01n 9/22
U.S. Cl. 71—94         10 Claims

ABSTRACT OF THE DISCLOSURE

There is provided a method for the pre-emergence or post-emergence control of undesirable plant species by applying to soil, seed or foliage a herbicidally effective amount of a compound of the formula:

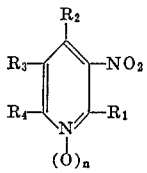

wherein $R_1$ stands for hydrogen, halogen, lower alkyl, halo lower alkyl or $OR^1$ wherein $R^1$ is lower alkyl or halo lower alkyl; $R_2$ is hydrogen, halogen, hydroxy, $SR^2$ or $OR^3$ wherein $R^2$ and $R^3$ are each hydrogen or lower alkyl; $R_3$ is hydrogen, halogen or nitro; $R_4$ is hydrogen, halogen, alkyl or halo lower alkyl; and $n$ is either 0 or 1; and the salts of said compounds.

---

This application is a continuation-in-part application of our copending application, Ser. No. 658,589, filed on Aug. 7, 1967, now U.S. Letters Patent No. 3,547,935, issued Dec. 15, 1970.

This invention relates to methods for controlling undesirable plant species. More particularly, the present invention relates to methods for controlling undesirable plant species by means of pre- or post-emergence application thereto of an effective amount of 3-nitropyridine having the structure:

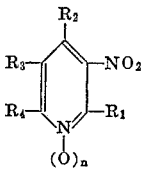

wherein $R_1$ is hydrogen, halogen, lower alkyl, halo lower alkyl or $OR^1$ wherein $R^1$ is lower alkyl or halo lower alkyl; $R_2$ is hydrogen, halogen, hydroxy, $SR^2$ or $OR^3$ wherein $R^2$ and $R^3$ are each hydrogen or lower alkyl; $R_3$ is hydrogen, halogen, or nitro; $R_4$ is hydrogen, halogen, alkyl or halo lower alkyl wherein at least one of $R_1$, $R_2$, $R_3$, and $R_4$ is a substituent other than hydrogen; and $n$ is either 0 or 1. The salts of the aforementioned, such as the ammonium, alkali metal, mono-, di or trialkylamine salts and equivalents thereof, are also contemplated herein.

Illustrative compounds are, for instance:

2,6-dimethyl-3,5-dinitro-4-pyridinol,
2-bromo-3-nitro-4-pyridinol,
2,5-dibromo-3-nitro-4-pyridinol,
5-bromo-3-nitro-4-pyridinol,
3-nitro-4-hydroxy-5-bromopyridine N-oxide,
5-bromo-2,6-dimethyl-3-nitro-4-pyridinol,
2,5,6-tribromo-3-amino-4-methoxypyridine,
2,5,6-tribromo-3-nitro-4-methoxypyridine,
2,5-dibromo-3-nitro-4-methoxypyridine,
3,5-dinitro-4-diethylaminopyridine,
3-nitro-4-di-n-propylamino-5-bromopyridine,
2-hexoxy-3,5-dinitropyridine, and
3,5-dinitro-4-ethylthiopyridine.

Compounds of the invention are conveniently prepared in a straightforward manner employing a variety of methods. One such method involves the treatment of a 4-pyridone or 4-hydroxypyridine nitrate with a mixture of fuming sulfuric acid and fuming nitric acid to yield the corresponding 3-nitro-4-hydroxypyridine or 3,5-dinitro-4-hydroxypyridine. Nitration of 2-pyridone is carried out in a similar manner. Another method involves the reaction of 4-nitropyridine N-oxide with acetic anhydride and an oxygen-containing gas, such as oxygen or air, under elevated temperatures of from about 75° C. to 100° C. to yield the corresponding 3-nitro-4-hydroxypyridine N-oxide. Still another procedure involves the treatment of 4-hydroxypyridine N-oxide with a mixture of acetic acid and nitric acid to yield 3,5-dinitro-4-hydroxypyridine N-oxide. When each of the so-formed products are further heated with phosphorus oxychloride, chlorine replaces the hydroxy group in the 4-position. However, when heating is continued for several hours, a second chloride atom is introduced into the 2-position on the pyridine ring, while the oxygen atom is removed from the ring nitrogen. Additionally, conversion of the hydroxyl group in the 3-nitro or 3,5-dinitro-4-hydroxypyridine derivatives of the invention can be attained by the reaction of said pyridines with phosphorus oxychloride. This is preferably accomplished in the presence of a solvent, such as dimethylformamide.

Halogenation of 3-nitropyridines can be achieved utilizing a variety of techniques. For instance, where bromination of 3-nitro-4-hydroxypyridines is to be effected, the 3-nitro-4-hydroxypyridine is generally slurried in water and bromine is slowly added to the stirring mixture. The corresponding chlorinated derivative may be obtained by chlorinating the 3-nitropyridine in an alkaline medium. 2-hydroxy-3-nitropyridine is halogenated in similar fashion. However, when a 3-amino-4-alkoxypyridine is brominated in an alcoholic medium, a mixture of brominated 3-amino-4-alkoxypyridines is formed. This product may then be treated with a mixture of fuming sulfuric acid and hydrogen peroxide, so as to effect oxidation of the amines to nitro substituents.

To obtain the alkoxy-, N-alkyl- or alkylthio-substituted 3-nitropyridine, the corresponding halo substituted 3-nitropyridine is dissolved in a suitable solvent, such as benzene and treated with an alkylamine, such as methylamine or ethylamine, an alcohol, such as ethanol or propanol or an alkylthio, such as methyl mercaptan or ethyl mercaptan, to displace halogen from the ring and substitute the desired corresponding substituent therefor.

For a better understanding of the invention, the following illustrative examples are presented. These are merely illustrative and are not to be taken as limitative.

EXAMPLE 1

Preparation of 3,5-dinitro-4-pyridinol

Four grams of 4-pyridone are placed in a flask and the flask submerged in a bath of ice water. Concentrated sulfuric acid is cautiously added. This is then followed by the addition of fuming nitric acid and held at about 23° C.–27° C. When the addition is completed, the solution is cautiously warmed to 125° C. and held there overnight. The reaction mixture is then cooled, poured into water and filtered. The pale yellow solid is washed twice with water and filtered. After drying overnight, 4.85 grams of solid are obtained, possessing a melting point of >290° C. and analyzing as:

Calcd. for $C_5H_3N_3O_5$:
Calcd.: C, 32.45; H, 1.63; N, 22.70; O, 43.22.
Found: C, 31.63; H, 1.69; N, 22.40.

EXAMPLE 2

Preparation of 3-nitro-4-pyridinol 12.6 grams of 4-hydroxypyridine nitrate are placed in a flask. Then while the flask is immersed in an ice bath, 26 grams of 20% oleum are cautiously added. When the addition is completed and the reaction has been stirred fifteen minutes, a total of 26 grams of fuming nitric acid are cautiously added. The solution is then heated on a steam bath to boiling for about sixty minutes. Resultant solution is then cooled and then poured on ice and a solid precipitated.

Precipitated solid is collected and washed once with water. The solid is air-dried. The air-dried solid weighs about 6.0 grams and possesses a melting point of from 283° C. to 284.5° C.

EXAMPLE 3

Preparation of 2,6-dimethyl-3,5-dinitro-4-pyridinol

Fuming nitric acid (6–7 ml.) is added to a flask to which concentrated sulfuric acid (9 ml.) is added while the solution is ice-cooled. The nitrate salt of 2,6-dimethyl-4-hydroxypyridine (2.4 g.) is then added to the mixture. No appreciable exotherm is observed as the solid readily dissolved. The solution is heated on a steam bath at 90° C. for three hours. Finally, the solution is cooled and poured on ice. The precipitated solid which is lemon-yellow is collected and dried in a vacuum oven. On a dry weight basis, 2 g. of the above-identified compound having a melting point >300° C. is obtained.

Analysis.—Calcd. for $C_7H_7N_3O_5$:
Calcd.: C, 39.44; H, 3.28; N, 19.72.
Found: C, 39.23; H, 3.19; N, 19.81.

EXAMPLE 4

Preparation of 2-bromo-3-nitro-4-pyridinol 2-bromo-4-hydroxypyridine (9.5 g., 0.055 mole) is added with cooling to 50 ml. of concentrated nitric acid. While this solution is cooled, 100 ml. of concentrated sulfuric acid is slowly added. The rate of addition is such that the temperature could easily be maintained below 25° C. with ice cooling. The solution is then warmed to 50° C. and held there for 18.5 hours. It is then cooled to 10° C. and poured on 200 grams of ice. Next, the mixture is partially neutralized with concentrated sodium hydroxide to a pH of about 4 and then filtered.

A 7.7 g. yield, 64.5% of the theoretical, of cream colored solid having a melting point equal to 187° C.–189° C. is obtained. By dissolving the latter compound in dimethyl sulfoxide and re-precipitating with water, the melting point can be raised to 191° C.–194° C.

Analysis.—Calcd. for $C_5H_3BrN_2O_3$:
Calcd.: C, 27.42; H, 1.38; N, 12.79; Br, 36.49.
Found: C, 27.61; H, 1.61; N, 12.67; Br, 36.21.

EXAMPLE 5

Preparation of 3-nitro-4-hydroxypyridine N-oxide

The compound was prepared by reaction of 4-nitro-pyridine N-oxide, 18 g., with acetic anhydride, 85 ml. The mixture is heated on a steam bath while passing air through it for several hours, then cooled and the mixture filtered. The product obtained is a yellow solid, which, when recrystallized from methanol and water, has a melting point of 225° C.–226° C.

EXAMPLE 6

Preparation of 3,5-dinitro-4-hydroxypyridine N-oxide 4-hydroxypyridine N-oxide (5.0 grams, 0.045 mole) is added to a mixture of acetic acid (25 ml.) and nitric acid (25 ml.). The mixture is heated to 50° C. and heating is discontinued. The temperature continued to rise. At 85° C., alternate cooling and heating is employed to hold the temperature at 75° C. to 80° C. for fifteen minutes. Finally, the mixture is poured on ice and filtered to remove the insoluble solid. The product is recrystallized from ethanol to give 6.8 grams (75.7%) having a melting point of from 202° C.–203° C. with decomposition.

EXAMPLE 7

Preparation of 2,5-dibromo-3-nitro-4-pyridinol 2-bromo-3-nitro-4-hydroxypyridine (7.0 g., 0.032 mole) is suspended in 60 ml. of water. While the mixture is stirred, bromine (6.4 g., 0.04 mole) is added. The temperature rose to 35° C. The mixture is stirred 30 minutes at room temperature, and then filtered. The solid is collected, resuspended in fresh water and refiltered. After drying in a vacuum oven at 60° C., the cream colored solid weighs 8.9 g. (93.5%) having a melting point equal to 244° C.–249° C. After recrystallization from acetonitrile, the melting point is raised to 256° C.–258° C.

Analysis.—Calcd. for $C_5H_2Br_2N_2O_3$:
Calcd.: C, 20.16; H, 0.68; N, 9.40; Br, 53.65.
Found: C, 20.23; H, 0.80; N, 9.21; Br, 53.84.

EXAMPLE 8

Preparation of 3,5-dinitro-4-chloropyridine

Four grams of 3,5-dinitro-4-hydroxypyridine are placed in a flask. There are then added 4 ml. of amine-free dimethylformamide followed by the addition of 20 ml. of phosphorus oxychloride. The slurry is warmed to 100° C. and the solution turned from a light yellow to a dark red. After stirring for 40 minutes, the solution is cooled and concentrated in vacuo to remove excess phosphorus oxychloride. The resultant dark liquid is poured on ice and the precipitated solid removed by filtration. Recovered crude solid weighs 4.1 grams. The latter is slurried with 500–600 ml. petroleum-ether and the mixture then filtered. The petroleum-ether is then concentrated, chilled and the above-named compound is a solid is recovered having a melting point equal to 65° C.–68° C.

EXAMPLE 9

Preparation of 3-nitro-4-methoxypyridine

Phosphorus pentachloride (10 g.) is suspended in phosphorus oxychloride (10 ml.) and, while stirring, 4-hydroxy-3-nitropyridine (5.6 g.) is cautiously added. Cooling is used to keep the temperature below 35° C. When all the solid has been added, the mixture is slowly warmed to a boiling temperature. After 2 hours of boiling, the solution is cooled slightly, and poured with great care into about 200 ml. of methanol. A large volume of ether is added and a white solid precipitated. Recrystallization from methanol yields 4-methoxy-3-nitropyridine hydrochloride, melting point >240° C.

Analysis.—Calcd. for $C_6H_6N_2O_3 \cdot HCl$:
Calcd.: C, 37.81; H, 3.70; N, 14.70; O, 25.18; Cl, 18.60.
Found: C, 38.01; H, 3.66; N, 14.75; Cl, 18.40.

This product is then dissolved in water and the aqueous solution made strongly basic with potassium carbonate. A white precipitate, 3-nitro-4-methoxypyridine, is collected and has a melting point of 67° C.–72° C.

EXAMPLE 10

Preparation of 3-nitro-4-chloro-5-bromopyridine 3-bromo-4-hydroxy-5-nitropyridine (4.0 g., 0.018 mole) is placed in a flask. To this are added phosphorus oxychloride (20 ml.) and 4 ml. of dimethylformamide. The reaction mixture is slowly warmed to boiling temperature. After 4 hours, the excess phosphorus oxychloride is removed *in vacuo*. The residue is poured over ice. A solid gradually forms and the solution becomes very dark. The solid is removed by filtration and is rapidly taken up in benzene and dried. Resultant oil (after removal of the benzene) solidifies when a seed and pentane are added. The solid is filtered to give 2.1 g. of a cream colored solid, melting point 45° C.–48° C.

EXAMPLE 11

Preparation of 5-chloro-3-nitro-4-pyridinol 3-nitro-4-pyridinol (5.0 g., 0.0357 mole) is dissolved in 100 ml. of water containing sodium hydroxide (3.0 g., 0.075 mole). Chlorine is bubbled into the solution until solid precipitates out and the temperature has risen to 45° C. An additional 3.0 g. of sodium hydroxide in 10 ml. of water is then added to dissolve resultant solids. Chlorine is once again introduced into the solution until a pH of 1.0 is attained and solid has precipitated. At no point during the chlorination step is the temperature permitted to exceed 45° C. The mixture is finally chilled and filtered to recover solids. Solids are next recrystallized from 2 to 1 water-dimethylformamido mixture to obtain 4.0 g. (64.5%) of white solids analyzing as:

Calcd. for $C_5H_3N_2OCl$:
    Calcd.: C, 34.40; H, 1.73; N, 16.05; Cl, 20.32.
    Found: C, 34.38; H, 1.74; N, 16.30; Cl, 20.09.

EXAMPLE 12

Preparation of 5-bromo-3-nitro-4-pyridinol 3-nitro-4-hydroxypyridine (2.8 g., 0.02 mole) is suspended in 25 ml. of distilled water. Bromine is added with some exotherm, being observed at 25° C. to 35° C. The slurry is then warmed on a steam bath for about 45 minutes, cooled and filtered after standing overnight. The white solid is dried in a vacuum oven at 60° C. The yield of white solid is 2.95 g., having a melting point of >290° C. and analyzing as:

Calcd. for $C_5H_3BrN_2O_3$:
    Calcd: C, 27.42; H, 1.38; Br. 36.49; N, 12.79.
    Found: C, 27.65; H, 1.52; Br, 36.27; N, 13.07.

EXAMPLE 13

Preparation of 3-nitro-4-hydroxy-5-bromopyridine N-oxide 4-hydroxy-3-nitropyridine N-oxide (1.0 g., 0.0064 mole) is stirred in 25 ml. of water while bromine (1.6 g., 0.01 mole) is added dropwise thereto. The mixture is stirred one hour and then filtered. The product is recrystallized from a methanol-water mixture to yield 0.6 g. of solid having a melting point equal to 227° C.–228° C.

Analysis.—Calcd. for $C_5H_3N_2O_4Br$:
    Calcd.: C, 25.55; H, 1.28; N, 11.92; Br, 34.02.
    Found: C, 25.69; H, 1.32; N, 12.40; Br. 34.20.

EXAMPLE 14

Preparation of 5-bromo-2,6-dimethyl-3-nitro-4-pyridinol 2,6 - dimethyl - 4 - hydroxy-3-nitropyridine (2.0 g.) is stirred in 50 ml. of water, while bromine (2.0 g., 0.0125 mole) is added. The mixture is stirred for 0.5 hour at ambient temperature during which time the temperature rose to 32° C. Finally, the mixture is heated for an hour on the steam bath, then chilled and filtered to obtain 2.6 g. (88.4%) of a white solid having a melting point of >300° C. whose analysis is as follows:

Calcd. for $C_7H_7N_2O_3Br$:
    Calcd.: C, 34.03; H, 2.85; N, 11.34; Br, 32.35.
    Found: C, 33.84; H, 2.89; N, 11.18; Br, 32.45.

EXAMPLE 15

Preparation of 2,5,6-tribromo-3-amino-4-methoxypyridine 4.1 grams of 3-amino-4-methoxy-5-bromopyridine are dissolved in 20–22 ml. of methanol. A bromine solution, 3.2 g., in 20 ml. of methanol is also prepared. Both solutions are chilled to 2°± 1° with an ice bath and the bromine solution is added to the alcoholic pyridine solution using an eye dropper. When the addition is complete, the solution is stirred 15 minutes. During this time the temperature is allowed to rise from 5° to 10°. The solution is poured into 150 ml. of water and solid precipitates. This solid is light brown, melting point 95° C.–101° C. When recrystallized from hexane, the produce has a melting point of from 110.5° C.–112.0° C.

Analysis.—Calcd. for $C_6H_5Br_3N_2O$:
    Calcd.: C, 19.97; H, 1.39; N, 8.0; Br, 66.43.
    Found: C, 20.21; H, 1.37; N, 7.89; Br, 66.50.

The filtrate from the reaction mixture when concentrated yields 2,5-dibromo-3-amino - 4 - methoxypyridine having a melting point equal to 77° C.–78° C.

EXAMPLE 16

Preparation of 2,5,6-tribromo-3-nitro-4-methoxypyridine

Five ml. of 30% hydrogen peroxide are placed in a flask and cooled in a Dry Ice acetone bath, fuming sulfuric acid (20%, 10 ml.) added. The temperature is held during the addition at —15 to +5°. 2,5,6-tribromo-3-amino-4-mehoxypyridine is dissolved with cooling in 3 ml. of concentrated $H_2SO_4$. This solution is then added to the oxidizing medium. The reaction is vigorously stirred. The reaction mixture is corked and allowed to stand (24 hours) without stirring at about 25° C. or room temperature. The entire reaction mixture is then poured on ice and filtered. A light yellow solid is obtained having a melting point of from 95° C. to 100° C. After recrystallization from hexane, this solid possesses a melting point of from 98° C. to 99.5° C.

Analysis.—Calcd. for $C_6H_3Br_3N_2O_3$:
    Calcd.: C, 18.44; H, 0.77; N, 7.17; Br, 61.34.
    Found: C, 18.50; H, 0.89; N, 7.03; Br, 61.26.

EXAMPLE 17

Preparation of 2,5-dibromo-3-nitro-4-methoxypyridine

The experimental procedure is essentially the same as that described in Example 16, except that 2,5-dibromo-3-amino-4-methoxypyridine is used as the starting material. After sanding overnight, a sample is removed and poured on ice. A solid precipitate which shows no N—H linkage by I.R. spectrum. The reaction mixture is next poured on ice and filtered. The solid is dried on a porous plate. After dissolving the solid in pet-ether and using Dry Ice to crystallize it, a white solid is isolated at slightly less than 0° C. This white solid has a melting point of from 41° C. to 44° C. and analyzed as follows:

Calcd. for $C_6H_4Br_2N_2O_3$:
    Calcd.: C, 23.10; H, 1.29; Br, 51.24; N, 8.98.
    Found: C, 23.18; H, 1.32; Br, 51.46; N, 8.83.

EXAMPLE 18

Preparation of 3,5-dinitro-4-diethylaminopyridine 0.9 gram of 4-chloro-3,5-dinitropyridine is dissolved in 20 ml. of benzene. Diethylamine is added as a benzene solution. Solid precipitates immediately and the reaction is mildly exothermic. The mixture is warmed slightly and then is allowed to stand for an additional twelve hours. The benzene insoluble solid is removed and washed with fresh benzene. Yellow crystals are collected. The yellow crystals are identical to the benzene soluble solid (0.9 g.) obtained by removal of the benzene *in vacuo*.

This product has a melting point of 157° C. to 158° C. and analyzes as follows:

Calcd. for $C_9H_{12}N_4O_4$:
 Calcd.: C, 45.00; H, 5.04; N, 23.33.
 Found: C, 44.87; H, 4.88; N, 23.47.

EXAMPLE 19

Preparation of 3-nitro-4-di-n-propyl-amino-5-bromopyridine

A sample of unrecrystallized 3-bromo-4-chloro-5-nitropyridine (1.0 g.) is dissolved in 20 ml. of benzene. The di-n-propylamine (0.9 g.) is added in one portion. The mixture is refluxed overnight, then filtered to remove the hydrochloride. The filtrate is concentrated in vacuo. The residue is a light red oil which after standing overnight solidifies to a dark yellow solid. The solid (0.8 g.) is recrystallized from alcohol-water after being decolorized with charcoal, melting point 50° C.–53° C.

Analysis.—Calcd. for $C_{11}H_{16}BrN_3O_2$:
 Calcd.: C, 43.72; H, 5.33; N, 13.91; Br, 26.44.
 Found: C, 43.97; H, 5.45; N, 14.05; Br, 26.54.

EXAMPLE 20

Preparation of 2-hexoxy-3,5-dinitropyridine 3.0 grams of 2-chloro-3,5-dinitropyridine and 50 ml. of hexanol are mixed in a flask. The solid dissolves as the reaction mixture is heated in an oil bath. The reaction temperature is slowly raised to 120° C. where it is kept overnight. The solution is allowed to cool to room temperature and hexanol removed using a high vacuum pump. The oily residue is distilled in vacuo and a light yellow liquid, boiling point, 142° C. to 146° C. at 0.1 mm. Hg is obtained.

Analysis.—Calcd. for $C_{11}H_{15}N_3O_5$:
 Calcd.: C, 49.07; H, 5.62; N, 15.61.
 Found: C, 49.78; H, 5.83; N, 15.61.

Similarly, other 2-alkoxy-3,5-dinitropyridines, such as 2-methoxy-, 2-β-chloroethoxy-, and 2-ethoxy-3,5-dinitropyridine, are prepared by the process of this example.

EXAMPLE 21

Preparation of 3-nitro-4-ethoxypyridine

A slurry of the crude 3-nitro-4-chloropyridine hydrochloride (6.0 g.) is prepared in 50 ml. of absolute ethanol. While this slurry is chilled, a solution of sodium ethoxide (1.4 g. Na in 50 ml. ethanol) is slowly added. The solid gradually disappeared. A yellow solution results and new solid analyzing as sodium chloride (NaCl) precipitates. The latter mixture is allowed to stand for one hour at room temperature and is filtered. The filtrate is concentrated in vacuo to about 25 ml. and is then poured into water. The solution is made basic with potassium carbonate and a solid slowly precipitates. The mixture is cooled to 0° C. for 30 minutes and filtered.

Shimmering white plates (3.2 g.) are collected and after drying overnight, the above-named solid compound is found to possess a melting point of 46.5° C.–48.0° C.

EXAMPLE 22

Preparation of 3-nitro-4-methoxy-5-bromopyridine

A solution of sodium methoxide (0.4 g., .0072 mole) in 10 ml. of methanol is prepared and chilled. Then, the solid 3-bromo-4-chloro-5-nitropyridine (1.7 g., 0.0072 mole) is added in one portion. The reaction mixture immediately becomes yellow, the starting material slowly goes into solution and a fine powder (NaCl) precipitates. After stirring for two hours at room temperature, the reaction mixture is poured into ice water where a solid readily solidifies. It is collected and air dried overnight. The solid (white) after drying overnight weighs 1.5 g., and has a melting point equal to 36° C.–37° C.

EXAMPLE 23

Preparation of 3,5-dinitro-4-ethylthiopyridine 0.8 gram of 4-chloro-3,5-dinitropyridine is dissolved in 5–10 ml. of benzene. To this is added a benzene solution containing an excess of ethanethiol. After standing 30 minutes at room temperature, the solution is warmed slightly for 15 minutes and then cooled. On cooling a crop of yellow crystals is depsited. The solid is readily dissolved in 50 ml. of hexane and decolorized. On concentration, a solid in the form of yellow needles having a melting point equal to between 72.5° C. and 73.0° C. is obtained, analyzing as:

Calcd. for $C_7H_7N_3O_4S$:
 Calcd.: C, 36.68; H, 3.08; N, 18.33; S, 13.99.
 Found: C, 36.76; H, 3.05; N, 18.20; S, 14.04.

EXAMPLE 24

Preparation of 3-amino-4-methoxy-5-bromopyridine

A mixture of 5-bromo-4-methoxy-3-nitropyridine (2.0 grams), iron powder (2.5 g.) and glacial acetic acid (50 ml.) is placed in a three-neck 200 ml. flask and warmed to 70° C. where an exothermic reaction takes place causing the temperature to rise to 80° C. When the temperature starts to fall to below 80° C., it is raised to 85° C. and held there for an hour. The mixture turns from a suspended black solid to between a suspended grey and white solid. The mixture is filtered. The filtrate is diluted with water, basified with sodium hydroxide and extracted with ether. After removal of the ether, the oily residue solidifies and weighs 1.4 grams. After recrystallization from benzene-pentane, 1.2 g. of a white solid having a melting point of 88° C. to 89.5° C. is obtained whose analysis is:

Calcd. for $C_6H_7N_2OBr$:
 Calcd.: C, 35.49; H, 3.48; N, 13.79; Br, 39.35.
 Found: C, 35.55; H, 3.45; N, 13.60; Br, 39.23.

EXAMPLE 25

Preparation of 3-nitro-6-bromo-4-pyridinol

The titled compound is obtained as the minor isomer in the nitration of 6-bromo-4-pyridinol. 6-bromo-4-pyridinol (10 g.) is added to a well chilled solution of concentrated nitric acid (40 ml.) followed by concentrated sulfuric acid (80 ml.). The solution is held at 48–50° C. for 20 hours, poured onto 175 g. of ice and then neutralized with 50% sodium hydroxide solution. A solid precipitated after 25 ml. of the basic solution had been added. The mixture is filtered after the addition of arbitrary amounts of base had been added. The solid is studied using thin layer chromatography on silica gel HF with 4:1 ethyl acetate to methanol. The first solid that precipitates is pure 3-nitro-2-bromo-4-pyridinol followed by a mixture of the two isomers. A pure sample (0.80 g.) of 3-nitro-6-bromo-4-pyridinol is finally obtained. The 3-nitro-6-bromo-4-pyridinol and 2-bromo-3-nitro-4-pyridinol isomers are clearly distinguishable on the basis of their N.M.R. curves. The 2-bromo-3-nitro compound shows two protons ortho coupled whereas the 6-bromo-3-nitro compound merely shows two singlets. The product is characterized as a cream colored solid having a melting point equal to 193–197° C.

Calcd. for $C_5H_3BrN_2O_3$:
 Calcd.: C, 27.42; H, 1.38; N, 12.79; Br, 36.49.
 Found: C, 27.67; H, 1.50; N, 12.63; Br, 36.45.

EXAMPLE 26

Preparation of 3-nitro-5,6-dibromo-4-pyridinol 3-nitro-6-bromo-4-pyridinol (0.4 g., 0.0018 mole) is suspended in 25 ml. of water while bromine (0.5 g., 0.0025 mole) was added. After standing 5–10 min., the slurry is filtered and the solid dried. The crude product (0.470 g.) had m.p. 210–212°. The product, obtained by reprecipitation from dimethylsulfoxide with water, is a white solid having a m.p. equal to 217–219° C.

Calcd. for $C_5H_2Br_2N_2O_3$:
Calcd.: C, 20.16; H, 0.68; N, 9.40; Br, 53.65
Found: C, 20.27; H, 1.02; N, 9.32; Br, 53.56

It is a good practice to apply the hereinabove-defined compounds as solids or liquids for pre- or post-emergence control of various plant species. Generally, the compounds are formulated with inert carriers or diluents and applied in sufficient amounts to provide at least about one-quarter pound of active ingredient per acre and usually between about one and twenty-five pounds per acre of active material depending upon the area to be treated and the type of vegetation to be controlled.

Diluents which may be used in the preparation of dusts, dust concentrates, wettable powders and the like include diatomaceous earth, talc, attapulgite, kaolin and fuller's earth. Generally about 5% to 95% by weight of active ingredient is thoroughly mixed with the diluent. This may be accomplished by dissolving the active material in a solvent such as acetone or cyclohexanone and spraying the solution on an agitated bed of diluent after which the entire mass is thoroughly mixed and dried. In the preparation of wettable powders, usually from about 1% to 10% by weight of an emulsifier, such as alkylaryl sulfonic acids, sodium alkylarylsulfonates and sorbitol longchain fatty acid esters are also added to the formulations in order to assure satisfactory dispersibility of the wettable powder in water for spray application. For liquid formulations the active ingredients are usually dissolved in an organic solvent, such as lower alcohols, such as methanol, ethanol, propanol or butanol, and isomers of the same, dimethyl sulfoxide, cyclohexanone, toluene, benzene, xylene or a heavy aromatic solvent, such as "Panasol An 5," "Esso H.A.W.," or "Socal 44–L," and either applied as such or further diluted with other less expensive solvents, such as deodorized kerosene or other hydrocarbon petroleum distillates. As concentrates, these liquid formulations may contain as much as 50 to 90 percent by weight of active ingredient and surfactants, spreaders, stickers or such may be added if desired.

EXAMPLE 27

Post-emergence herbicidal activity

The post-emergence activity of the compounds of the invention is demonstrated by the following tests wherein healthy monocotyledonous and dicotyledonous weeds and crop plants, approximately two weeks old, are treated with solutions containing various levels of active ingredient. The test compounds are dissolved or dispersed in 35% acetone, 65% water mixture in sufficient amount to provide the desired level of compound when the plants are sprayed for a predetermined time at an established rate. Plants employed in the tests include:

| Species: | Abbreviation |
|---|---|
| Bindweed | BW |
| Canada thistle | CT |
| Johnsongrass | JG |
| Nutsedge | NS |
| Quack grass | QS |
| Kochia | KO |
| Lamb's-quarters | LA |
| Mustard | MU |
| Pigweed | Pi |
| Barnyard grass | BA |
| Crab grass | CR |
| Green foxtail | GRF |
| Wild oats | WO |
| Corn | Cor |
| Cotton | Cot |
| Sugar beet | SB |
| Soybean | Soy |
| Tomato | TO |
| Wheat | WH |
| Millet | Mi |

After spraying, the plants are placed in the greenhouse and cared for in accordance with greenhouse practices. Two weeks after treatment the plants are examined and rated according to the following Herbitoxicity Index.

Herbitoxicity Index

9=100% reduction in stand
9—=1 or 2 stunted plants remaining
8=85–<100% reduction in stand
7=70–<85% reduction in stand
6=60–<70% reduction in stand
5=50–<60% reduction in stand
4=40–<50% reduction in stand
3=30–<40% reduction in stand
2=20–<30% reduction in stand
1=10–<20% reduction in stand
0=no apparent effect
s=severe injury
m=moderate injury
t=trace to slight injury
c=chlorosis The results are recorded in Tables I and II below.

TABLE I
Post-emergence

| Structure | Lb./a. | BW | CT | JG | NS | QS | KO | LA | MU | PI | BA | CR | GRF | WO | COR | COT | SB | SOY | TO | WH |
|---|---|---|---|---|---|---|---|---|---|---|---|---|---|---|---|---|---|---|---|---|
| 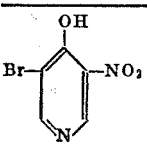 | 10 | 9 | 9 | 9 | m | m | 9 | 9 | 9 | 9 | 9– | 9– | | 9 | 9 | | | | 9 | t |
| | 2 | m | m | t | t | m | 9 | 9 | 9 | 9 | s | t | | 8 | 9 | | | | | |
| 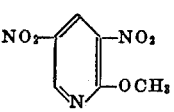 | 10 | | | | | | 9 | 5 | 9 | 8 | 9 | 3 | | 8 | t | | | | | |
| | 2 | | | | | | 3 | 0 | 3 | 0 | 0 | 0 | | 0 | 0 | | | | | |
| 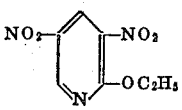 | 6 | | | | | | 9 | 9 | 9 | 9 | 9– | t | | 9 | m | m | | 9 | 8 | 4 |
| | 3 | | | | | | 9 | 9 | 9 | 9 | 4 | t | | 7 | t | t | 9– | 8 | t | |

TABLE I—Continued

| Structure | Lb./a. | BW | CT | JG | NS | QS | KO | LA | MU | PI | BA | CR | GRF | WO | COR | COT | SB | SOY | TO | WH |
|---|---|---|---|---|---|---|---|---|---|---|---|---|---|---|---|---|---|---|---|---|
| 4-Cl, 3-Br, 5-NO₂ pyridine | 10 | | | | | | 9 | 0 | 9 | t | 9 | | m | | | | | | s | 0 |
| | 3 | | | | | | 9 | 9 | 9 | 9 | t | t | t | 0 | m | 9— | 7 | m | | |
| 4-OH, 3-Cl, 5-NO₂ pyridine | 4 | | | | | | 9 | 9 | 9 | 9 | t | t | 8 | 9 | m | 9 | 9 | 7m | | |
| | ½ | | | | | | 9 | 2 | 9— | 9 | 9 | 0 | 0 | 0 | t | t | 9 | 9— | t | |
| 4-SH, 3-Br, 5-NO₂ pyridine | 10 | | | | | | 9 | 9 | 9 | 9— | 5m | | 3 | | | | | | 9 | t |
| 4-OCH₃, 3-Br, 5-NO₂ pyridine | 9 | | | | | | 9 | 9 | 9 | 9 | t | 5 | 7 | t | 3 | 9 | 9 | m | | |
| | 3 | | | | | | 9 | 9— | 5 | 9 | t | t | t | 0 | 3 | 9 | 8 | t | | |
| 4-SH, 3-Br, 5-NO₂ pyridine | 10 | | | | | | 9 | 9 | 9 | 9— | 5m | — | 3 | | | | | | 9 | t |
| 4-OH, 3-Br, 5-NO₂, 2-CH₃ pyridine | 10 | | | | | | 9— | 9 | t | 0 | 0 | | t | | | | | | 9 | |
| 3-OH, 4-NO₂, 2-Br pyridine | 10 | | | | | | 9 | 9 | s | s | m | | 9 | | | | | | 9 | s |
| 4-OH, 3-Br, 5-NO₂, 2-Br pyridine | 10 | | | | | | 9 | 9 | 9 | 9 | 9 | | 9 | | | | | | 9 | 8 |
| 4-OH, 3-Br, 5-NO₂, 2-CH₃ pyridine | 10 | | | | | | 9 | 9 | m | 0 | 0 | | t | | | | | | mc | 0 |
| 4-OH, 3-Br, 2-NO₂ pyridine (Br at 6) | 4 | | | | | | 9 | 9 | 9 | 9— | 9 | 9 | 9 | 9 | | | | | | |
| | 1 | | | | | | 9 | t | 9 | 5c | t | t | 9 | 9— | | | | | | |
| 4-OH, 3-Br, 5-NO₂, 6-Br pyridine | 4 | | | | | | 9 | 9 | 9 | 9 | 9 | 9 | 9 | 9 | | | | | | |
| | 1 | | | | | | 9 | 9 | 9 | 9 | t | 5 | 9 | 8 | | | | | | |

TABLE II

The selective post-emergence herbicidal performance of

Compound (A)         Compound (B)

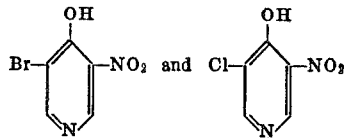

| Treatment | Herbitoxicity rating | | | | | | | | | | | |
|---|---|---|---|---|---|---|---|---|---|---|---|---|
| | KO | LA | MU | PI | BA | CR | GF | WO | COR | COT | SOY | SB |
| Rate of application—4 lb./a.: | | | | | | | | | | | | |
| Compound A | 9 | 9 | 9 | 9 | s | t | 9 | 9c | m | 9 | 8 | 9 |
| Compound B | 9 | 9 | 9 | 9 | t | t | 8 | 9 | m | 9 | 7m | 9 |
| Rate of application—1 lb./a.: | | | | | | | | | | | | |
| Compound A | 9 | 9 | 9 | 9 | t | t | t | 9 | t | 9 | 4m | 9 |
| Compound B | 9 | 9— | 9 | 9 | 0 | 0 | t | t | m | 9 | 5 | 9 |
| Rate of application—½ lb./a.: | | | | | | | | | | | | |
| Compound A | 9 | 9 | 9— | 9 | t | 0 | 0 | 3 | t | 9 | t | 9 |
| Compound B | 9 | s | 9— | 9— | 0 | 0 | 0 | t | t | 9 | t | 9— |
| Rate of application—¼ lb./a.: | | | | | | | | | | | | |
| Compound A | 9 | 9 | 9 | 9 | 0 | 0 | 0 | t | t | 9 | t | 5s |
| Compound B | 9 | s | s | 9— | 0 | 0 | 0 | t | t | 8 | t | 7s |

NOTE.—Date recorded 5 wks. following application indicated that—
a. Compound A at ¼ lb./a. killed all broadleaf weeds while Compound B killed only kochia and pigweed.
b. Corn tolerated both chemicals at 4 lb./a., soybeans at ½ lb./a.

EXAMPLE 28

Selective pre-emergence herbicidal activity

The selective pre-emergence herbicidal activity of the compounds of the invention is demonstrated by the following tests wherein seeds of various plant species, planted in potting soil in cups, are sprayed with aqueous-acetone solutions containing sufficient active ingredient to provide the desired treatment. Test compounds are dissolved or dispersed in a 35% acetone/65% water mixture. The mixtures are then sprayed on the cups of planted seeds in sufficient amount to provide the equivalent of .5, 1, 2, 3, 4, 5, 6, 7.5, 12 or 15 lbs. of active ingredient per acre. The cups are then placed in the greenhouse and cared for in the usual manner of greenhouse procedure. Two weeks after treatment all cups are examined and rated according to the Herbitoxicity Index provided in the previous example.

The results are recorded in tabular form in Tables III and IV below. Other plant species employed in there tests which were not employed in the tests of the previous example are:

| Species: | Abbreviation |
|---|---|
| Velvet leaf | VEL |
| Chickweed | CW |
| Giantfoxtail | GF |
| Peanut | PN |
| Purslane | PU |
| Snap bean | SB |

Tables IV and V provide selective pre-emergence data for specific compounds and their salts at various rates of application. Table VI provides residual pre-emergence data at several rates of application for extended periods of time.

TABLE III
Pre-emergence

| Structure | Lb./a. | KO | LA | MU | PI | PU | VEL | CW | BA | CR | GRF | WO | GF | COR | COT | PN | SB | SOY | SB | WH | Mi |
|---|---|---|---|---|---|---|---|---|---|---|---|---|---|---|---|---|---|---|---|---|---|
| Br-pyridine-OH-NO₂ | 3 | 9 | 9 | 3 | 9 | 9— | 9— | 9 | 7 | s | 9 | 9 | 9— | 0 | m | 0 | 9 | t | 0 | 9— | |
| | 1 | 9 | 9 | 0 | 9 | | | | 0 | 0 | | m | | 0 | 5 | | 9 | 0 | | | |
| Cl-pyridine-OH-NO₂ | 3 | 9 | 9 | 3 | 9 | 9 | 9— | 9 | 7 | m | 8 | 9 | 9— | 0 | m | 0 | 9 | t | 0 | 9— | |
| | 0.5 | 9 | 9 | 0 | 9 | | | | t | 0 | 5 | m | | 0 | 0 | | 3 | 0 | | | |
| NO₂-pyridine-NO₂-OCH₃ | 15 | 9 | t | m | 9 | | | | 9 | 9 | 9 | t | | | | | | | | | |
| | 6 | | t | 0 | 9— | | | | 8 | 7 | 9— | 0 | 9— | 0 | 0 | | 0 | 0 | | | |
| OH-pyridine-NO₂ | 12 | 9 | 9— | 9— | 9 | | | 9— | 9— | 9 | | t | s | | 9 | m | | | | | |
| | 4 | 9— | 9— | 9— | 9 | | | | 0 | 0 | 5 | m | | 0 | 0 | | s | 0 | | | |
| OCH₃-pyridine-NO₂ | 12 | 8 | 8 | 5 | 9 | | | | 9 | 8s | 9 | t | | 0 | t | | m | t | | | |
| | 6 | 5c | t | t | 9 | | | | 5 | 5 | 9 | t | | 0 | 0 | | t | t | | | |

TABLE III—Continued

| Structure | Lb./a. | KO | LA | MU | PI | PU | VEL | CW | BA | CR | GRF | WO | GF | COR | COT | PN | SB | SOY | SB | WH | Mi |
|---|---|---|---|---|---|---|---|---|---|---|---|---|---|---|---|---|---|---|---|---|---|
| 3,5-dinitro-4-hydroxypyridine | 7.5<br>3 | 9<br>7 | 9<br>8 | 9<br>0 | 9<br>9— | | | | 0<br>0 | 0<br>0 | 0<br>0 | 0<br>0 | | 0<br>0 | 0<br>0 | | 0<br>0 | 0<br>0 | | | |
| 4-amino-3,5-dinitropyridine | 15 | 0 | 8 | 8 | 9— | | | | 6 | 8 | 8 | 0 | | | | | | | | | |
| 2-bromo-3-nitro-4-hydroxypyridine | 25 | | | 9 | | | | | | | | | | | | | | | | 9 | 9 |
| 2,5-dibromo-3-nitro-4-hydroxypyridine Na salt | 15<br>5 | 9<br>9 | 8<br>9 | 9<br>9 | 9<br>9 | | | | 9<br>9 | 9<br>9 | 9<br>9 | 9<br>9— | | | | | | | | | |
| 5-bromo-4-chloro-3-nitropyridine | 12<br>6 | 9<br>0 | 9<br>8 | 0<br>0 | 9<br>9 | | | | 0<br>0 | t<br>t | 8<br>0 | 0<br>0 | | 0<br>0 | 0<br>0 | | 4<br>5 | 0<br>0 | | | |
| 3-bromo-4-methoxy-5-nitropyridine | 12<br>3 | 9<br>9 | 9<br>9 | 3<br>0 | 9<br>9 | | | | 8<br>0 | m<br>0 | 8<br>0 | 9<br>t | | 0<br>0 | 9<br>0 | | 9<br>9 | 0<br>0 | | | |
| 3-bromo-4-di(n-propyl)amino-5-nitropyridine | 6<br>3 | t<br>0 | m<br>t | 0<br>0 | 5<br>m | | | | 9<br>7 | 9<br>6 | 9<br>8 | 0<br>0 | | 0<br>0 | 0<br>0 | | 0<br>0 | 0<br>0 | | | |
| 3-bromo-4-hydroxy-5-nitropyridine N-oxide | 6<br>2 | 9<br>8 | 9—<br>7 | 0<br>0 | 9<br>9 | | | | m<br>0 | t<br>t | 5<br>0 | 7<br>m | | 3<br>0 | t<br>0 | | 9<br>3 | 0<br>0 | | | |
| 2-ethoxy-3,5-dinitropyridine | 15<br>5 | 5<br>m | 5<br>t | 9—<br>t | 9<br>5 | | | | 9—<br>2 | 9<br>3 | 9—<br>8 | t<br>0 | | 3<br>0 | t<br>0 | | 2<br>0 | 0<br>0 | | | |
| 2,5-dibromo-3-nitro-4-hydroxypyridine | 15 | 9 | 9 | 9 | 9 | | | | 9 | 9 | 9 | 9 | | | | | | | | | |
| 2-bromo-5-nitro-4-hydroxypyridine | 4<br>1 | 9<br>9 | 7<br>0 | 9<br>— | 9<br>3g | | | | 9c<br>2g | 5<br>0 | 9<br>9 | 9<br>3c | | | | | | | | | |
| 2,5-dibromo-3-nitro-4-hydroxypyridine | 4<br>1 | 9<br>3 | 8g<br>t | 9c<br>8c | 9<br>5g | | | | 9<br>9 | 9<br>9— | 9<br>3g | 9<br>tc | | | | | | | | | |

TABLE IV

Selective pre-emergence herbicidal performance of—

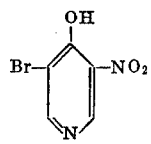

and the salts thereof at various rates of application

| Test species | 12a | 9b | 8c | 8d | 6a | 4c | 3b | 3a | 3c | 3f | 2d | 2c | 1½a | 1½f | 1b | 1c | ¾a | ¾f | ½d | ½c | ⅜a | ¼c | ⅛c |
|---|---|---|---|---|---|---|---|---|---|---|---|---|---|---|---|---|---|---|---|---|---|---|---|
| Lambsquarters | 9 | 9 | | 9 | 9 | | 9 | 9 | 9 | 9 | 9 | | 9 | 9 | 9 | | 9 | 9 | 9 | 9— | 9— | 8 | |
| Pigweed | 9 | 9 | | 9 | 9 | | 9 | 9 | 9 | | 9 | | 9 | | 9 | | 9 | | 9 | 9 | | 8 | 0 |
| Kochia | 9 | 9 | | 9 | 9 | | 9 | 9 | 9 | | 9 | | 9 | | 9 | | 9 | | 9 | 5 | | 0 | 0 |
| Chickweed, common | | | | | | | | | | 9 | | | | | | | | | 9— | | mg | 0 | 0 |
| Foxtail, green | 9 | 9 | | 9 | 9 | | 8 | 8 | 9—c | | 8c | | 3m | | s | | t | | 6c | 0 | | 0 | 0 |
| Wild oats | 9 | 9 | 9 | 9c | 9 | 9 | 9 | 9 | 9c | 9—c | 9c | 9— | 9c | tc | s | t | tc | 0 | mc | 0 | 0 | 0 | 0 |
| Cheat | | 9 | | | 9 | | | | | 9 | | 9— | | | | 0 | | | | t | | 0 | 0 |
| Mustard | 9 | 9 | | 9 | 9— | | 8 | 8 | 4 | 3 | 3 | tg | | t | 0 | 0 | | 0 | 0 | 0 | 0 | 0 | 0 |
| Purslane | | | | | | | | | 9— | | | | | | | | | | | 0 | | 0 | 0 |
| Velvetleaf | | | | | | | | | 9 | | | | | | | | | | | 0 | | 0 | 0 |
| Barnyard grass | 9 | 8 | | 9c | 9 | | 3 | 8 | 7 | | t | 5c | | s | t | 0 | | t | 0 | 0 | 0 | 0 | 0 |
| Foxtail, giant | | | | | | | | | 9—c | | | | | | | | | | tc | | | 0 | 0 |
| Jimsonweed | | | | | | | | | | 3sg | | | | 0 | | | 0 | | | 0 | | | |
| Crabgrass | 7g | 3 | | 6a | 4t | | 3 | 2 | sg | 0 | 3 | | 0 | | 0 | 0 | 0 | | 0 | 0 | 0 | 0 | 0 |
| Johnson grass | | | | | | | | | | tg | | | tg | | | | | | 0 | | 0 | | |
| Morning glory | | | | | | | | | 0 | | | | 0 | | | | | | 0 | | 0 | | |
| Sugar beet | 9 | 9 | | 9 | 9 | | 9 | 9 | 9 | 9 | 9 | | 9 | 9 | 9 | | 9 | 9— | 5 | mc | | 0 | 0 |
| Millet | | | | | | | | | | | | | | | | | | | | | | | |
| Cotton | | 9— | | | 9— | | | 8c | | | 5 | | | | 0 | | | | 0 | | | 0 | 0 |
| Barley | | 9 | | | 9 | | | 8 | | | t | | | | 0 | | | | 0 | | | 0 | 0 |
| Alfalfa | | | | | | | | 9 | | | | | | | | | | | 0 | | | 0 | 0 |
| Flax | | 9— | | | 9— | | | 8c | 8 | | 5 | | tg | | 0 | | tg | | | 0 | 0 | 0 | 0 |
| Wheat | | 8 | | | 8 | | | 9—c | | | tc | | | | 0 | | | | 0 | | | 0 | 0 |
| Soybean | 9 | 5 | 0 | m | t | 0 | t | 0 | tg | | 0 | 0 | 0 | | 0 | 0 | 0 | | 0 | | | 0 | 0 |
| Birdsfoot, trefoil | | | | | | | | | 0 | | | | | | | | | | | 0 | | 0 | 0 |
| Corn | | 9 | | | 9 | | | 8 | | | t | | | | 0 | | | | 0 | | | 0 | 0 |
| Peanut | | 0 | | | 0 | | | 0 | | | 0 | | | | 0 | | | | 0 | | | 0 | 0 |
| Snapbean | | 9— | | | t | | | 0 | | | 0 | | | | 0 | | | | 0 | | | 0 | 0 |
| Oats | | 9 | | | 8 | | | | | | 3 | | | | 0 | | | | 0 | | | | |
| Winter rye | | 9 | | | 9 | | | | | | t | | | | 0 | | | | 0 | | | | |

[1] NOTES:
a Applied as an acetone water solution.
b Applied as an acetone water solution.
c Applied as the sodium salt.
d Applied as the sodium salt.
e Applied as the sodium slat.
f Applied as the triethylamine salt, data recorded after 3 weeks.

TABLE V

Selective pre-emergence herbicidal performance of—

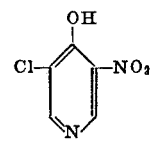

and salts thereof at graded levels of application

| Test species | 8a | 4b | 3c | 3d | 2b | 2c | 2a | 1½d | 1b | 1c | ¾d | ½c | ½c | ½a | ⅜d | ¼c | ¼c | ⅛c |
|---|---|---|---|---|---|---|---|---|---|---|---|---|---|---|---|---|---|---|
| Lambsquarters | | 9 | | 9 | 9 | | 9 | 9 | 9 | | 9 | 9 | 8 | 9 | 9 | 9 | mg | 9 | 9 |
| Pigweed | | 9 | | 9 | | | 9 | 9 | | | 9 | | 9 | 9 | 9 | | 7 | 9 | 0 |
| Kochia | | 9 | | 9 | | | 9 | 9 | | | 9 | | 3 | 9— | | 9 | 0 | 7 | 0 |
| Chickweed, common | | | | 9 | | | | | | | | 9— | | | | mg | | | |
| Foxtail, green | 8c | 9 | 8c | | 9— | | 9 | 9— | | 7 | 8 | | 0 | 3 | 5c | | 0 | 0 | 0 |
| Wild oats | 9c | 9 | 9c | 9c | 9— | | 9 | 8c | 5c | tc-7 | 9— | 0 | 0 | 0 | mc | 0 | 0 | 0 | 0 |
| Cheat | | | 9 | | | | | | | | | 0 | | | | | 0 | | 0 |
| Mustard | 9 | | 3 | 8 | | 0 | 7 | 0 | | 0 | 0 | 0 | 0 | 0 | 0 | | 0 | 0 | 0 |
| Purslane | | | 9 | | | | | | | | | 0 | | | | | 0 | | 0 |
| Velvetleaf | | | 9 | | | | | | | | | 0 | | | | | 0 | | 0 |
| Barnyard grass | 9 | 9— | 7 | sga | 5-7 | | 7 | 5c | tg | 0 | mg | tg | 0 | 0 | t | 0 | 0 | 0 | 0 |
| Foxtail, giant | | | 9c | | | | | | | | | 0 | | | | | 0 | | |
| Jimsonweed | | | 8sg | | | | | sg | | | | 0 | | | 0 | | | | |
| Crabgrass | 7a | 0 | mg | tg | 0 | 0 | 2g | 0 | 0 | 0 | 0 | 0 | 0 | 0 | | 0 | 0 | 0 |
| Johnson grass | | | | tg | | | | tg | | | tg | | 0 | | | | 0 | | |
| Morning glory | | | | 0 | | | | 0 | | | 0 | | 0 | | | | 0 | | |
| Sugar beet | 9 | | 9 | 9 | | 9 | 9 | 9 | | 9 | 9 | t | 9 | 3 | 7 | 0 | 3 | 0 |
| Millet | | 9 | | | 9 | | 9 | | | 8 | 9 | | 8 | | | 0 | | | |
| Cotton | 9 | | m | | | | 9 | | | | 0 | | 0 | | | 0 | | | 0 |
| Barley | | | 8 | | | | | | | | 0 | | 0 | | | 0 | | | 0 |
| Alfalfa | | | 9 | | | | | | | | 0 | | 0 | | | 0 | | | 0 |
| Flax | | | 9-c | sgc | | | | sgc | | | tgc | | 0 | | | 0 | | | 0 |
| Wheat | | | 9-c | | | | | | | | 0 | | 0 | | | 0 | | | 0 |
| Soybean | 9 | | tg | | | | 0 | | | | 0 | | 0 | 0 | | 0 | | | 0 |
| Birdsfoot, trefoil | | | 0 | | | | | | | | 0 | | 0 | | | 0 | | | |
| Corn | m | | 0 | | | | 0 | | | | 0 | | 0 | | | 0 | | | |
| Peanut | | | 0 | | | | | | | | 0 | | 0 | | | 0 | | | |
| Snapbean | | | 0 | | | | | | | | 0 | | 0 | | | 0 | | | |

[1] NOTES
a Applied as the sodium salt, data recorded after 5 weeks.
b Applied as the sodium salt, data recorded after 4 weeks.
c Applied as the sodium salt, data recorded after 4 weeks.
d Applied as the triethylamine salt, data recorded after 3 weeks.
e Applied as the sodium salt, data recorded after 5 weeks.

TABLE VI

The residual pre-emergence herbicidal performance of compounds of the invention at various rates of applicatio

| CL number | Time of seeding relative to treatment | SgB | Ka | La | Mu | Pl | Ba | Cr | GF | WO | Mi |
|---|---|---|---|---|---|---|---|---|---|---|---|
| Rate of application—4 lb./a.: | | | | | | | | | | | |
| Br—[pyridinol]—NO$_2$ (OH) | Just before | 9 | 9 | 9 | 8 | 9 | sgc | mg | | 9c | 9 |
| | 1 week after | 9 | 9 | 9 | 3 | 9 | sg | 0 | 9 | 9 | 9 |
| | 2 weeks after | 9 | 9 | 9 | 3 | 9 | sg | 0 | 9 | 9 | 9 |
| | 4 weeks after | 9 | 9 | 9 | g | 9 | mg | 0 | 9— | 9 | 9 |
| | 8 weeks after | | | | | | | | | | |
| Cl—[pyridinol]—NO$_2$ (OH) | Just before | 9 | 9 | 9 | 9— | 9 | 8sgc | mg | | 9 | 9— |
| | 1 week after | 9 | 9 | 9 | 9— | 9 | 5 | tg | 9 | 9— | 9 |
| | 2 weeks after | 9 | 9 | 9 | 9— | 9 | | | 9 | 9— | 9 |
| | 4 weeks after | 9 | 9 | 9 | 0 | 9 | mg | 0 | 9 | 8 | 9— |
| | 8 weeks after | | | | | | | | | | |
| Rate of application—2 lb./a.: | | | | | | | | | | | |
| Br—[pyridinol]—NO$_2$ (OH) | Just before | 9 | 9 | 9 | 3 | 9 | mgc | 0 | | 9c | 9— |
| | 1 week after | 9 | 9 | 9 | 0 | 9 | 0 | 0 | 9 | | 9 |
| | 2 weeks after | 9 | 9 | 9 | 0 | 9 | tg | 0 | 9— | | 9 |
| | 4 weeks after | 9 | 9 | 9 | 0 | 9 | 0 | 0 | 7sg | tg | 5 |
| | 8 weeks after | | | | | | | | | | |
| Br—[pyridinol]—NO$_2$ (OH) | Just before | 9 | 9 | 9 | 3 | 9 | mgc | tg | | 9— | 9— |
| | 1 week after | 9 | 9 | 9 | 0 | 9 | 0 | 0 | 9 | | 9— |
| | 2 weeks after | 9 | 9— | 9 | 0 | 9 | 0 | 0 | 9— | 9 | 9— |
| | 4 weeks after | 9 | 9 | 9 | 0 | 9 | 0 | 0 | 7sg | s | 7 |
| | 8 weeks after | | | | | | | | | | |
| Rate of application—1 lb./a.: | | | | | | | | | | | |
| Br—[pyridinol]—NO$_2$ (OH) | Just before | 9 | 9 | 9 | 0 | 9 | 0 | 0 | | 0 | 0 |
| | 1 week after | 9 | 9— | 9 | 0 | 9 | 0 | 0 | 3 | | 7 |
| | 2 weeks after | 9 | 8 | 9 | 0 | 9 | 0 | 0 | sg | 0 | t |
| | 4 weeks after | 9— | 7 | 9— | 0 | 9 | 0 | 0 | 0 | 0 | 0 |
| | 8 weeks after | | | | | | | | | | |
| Cl—[pyridinol]—NO$_2$ (OH) | Just before | 9— | 9— | 9 | 0 | 9 | tgc | 0 | | t | 7gc |
| | 1 week after | 9 | 3 | 9 | 0 | 9 | 0 | 0 | 3 | 0 | 7 |
| | 2 weeks after | 9 | 3 | 9 | 0 | 9 | 0 | 0 | sg | 0 | t |
| | 4 weeks after | 9— | 7 | 9— | 0 | 9— | 0 | 0 | 0 | 0 | 0 |
| | 8 weeks after | | | | | | | | | | |

We claim:

1. A method for controlling undesirable plant species comprising: applying thereto a herbicidally effective amount at a rate from 0.25 pound per acre to 1 pound per acre of a compound selected from the group consisting of 3-nitro-5-bromo-4-pyridinol, 3-nitro-5-chloro-4-pyridinol, 2,5-dibromo-3-nitro-pyridinol, 3-nitro-4-methoxy-5-bromo-pyridine, 3-nitro-5,6-dibromo-4-pyridinol, 6 bromo-3-nitro-4-pyridinol and 2-bromo-3-nitro-4-pyridinol.

2. A method according to Claim 1 wherein the compound is 3-nitro-5-bromo-4-pyridinol.

3. A method according to Claim 1 wherein the compound is 3-nitro-5-chloro-4-pyridinol.

4. A method according to Claim 1 wherein the compound is 2-5-dibromo-3-nitro-4-pyridinol.

5. A method according to Claim 1 wherein the compound is 3-nitro-4-methoxy-5-bromo-pyridine.

6. A method according to Claim 1 wherein the compound is 3-nitro-5,6-dibromo-4-pyridinol.

7. A method for the selective pre-emergence control of undesirable plant species in the presence of planted crops comprising: applying to the soil containing seeds of crops and undesirable plant species a herbicidally effective amount of a compound of Claim 1.

8. A method according to Claim 7 wherein the compound is: 3-nitro-5-bromo-4-pyridinol, 3-nitro-5-chloro-4-pyridinol, 2,5-dibromo-3-nitro-4-pyridinol, 3-nitro-4-methoxy-5-bromo-pyridine, or 3-nitro-5,6-dibromo-4-pyridinol.

9. A method for the selective post-emergence control of undesirable plant species in the presence of crops comprising: applying to the foliage thereof a herbicidally effective amount of a compound of Claim 7.

10. A method according to Claim 9 wherein the herbicidally effective compound is: 3-nitro-5-bromo-4-pyridinol, 3-nitro-5-chloro-4-pyridinol, 2,5-dibromo-3-nitro-4-pyridinol, 3-nitro-4-methoxy-5-bromopyridine, or 3-nitro-5,6-dibromo-4-pyridinol.

References Cited

UNITED STATES PATENTS

| 2,943,976 | 6/1960 | Goodhue et al. | 424—263 |
| 3,409,624 | 11/1968 | De Selms | 260—294.8 |
| 3,317,542 | 5/1967 | Haszeldine et al. | 71—94 X |
| 3,355,275 | 11/1967 | Weil et al. | 71—94 |
| 3,630,714 | 12/1971 | De Selms | 71—90 |

ELBERT L. ROBERTS, Primary Examiner

C. L. MILLS, Assistant Examiner